(12) United States Patent
Ritter et al.

(10) Patent No.: US 6,183,578 B1
(45) Date of Patent: Feb. 6, 2001

(54) METHOD FOR MANUFACTURE OF HIGH FREQUENCY ULTRASOUND TRANSDUCERS

(75) Inventors: Timothy A. Ritter, Bellefonte; Eugene R. Gerber, Lewistown; Kirk Shung, State College; Thomas R. Shrout, Port Matilida, all of PA (US)

(73) Assignee: Penn State Research Foundation, University Park, PA (US)

( * ) Notice: Under 35 U.S.C. 154(b), the term of this patent shall be extended for 0 days.

(21) Appl. No.: 09/295,679

(22) Filed: Apr. 21, 1999

Related U.S. Application Data

(60) Provisional application No. 60/082,491, filed on Apr. 21, 1998.

(51) Int. Cl.[7] .......................... B32B 31/06; B32B 31/18; B32B 31/26

(52) U.S. Cl. .................... 156/89.12; 156/89.14; 156/155; 156/250; 264/610

(58) Field of Search .............. 156/89.11, 89.12, 156/89.16, 89.14, 250, 155, 89.23, 145; 264/610, 614

(56) References Cited

U.S. PATENT DOCUMENTS

| | | |
|---|---|---|
| 4,514,247 | 4/1985 | Zola . |
| 4,572,981 | 2/1986 | Zola . |
| 5,191,559 * | 3/1993 | Kahn et al. . |
| 5,644,085 * | 7/1997 | Lorraine et al. . |
| 5,655,538 * | 8/1997 | Lorraine et al. . |
| 5,722,137 * | 3/1998 | Lorraine et al. . |

OTHER PUBLICATIONS http://www.endosonics,com/products/five–64.htm, 1997, pp., "Versions' Five–64 Solid State Intravascular Ultrasound Catheters".

1996 IEEE Ultrasonics Symposium, pp. 943–947, A. Nguyen–Dinh, et al, "High Frequency Piezo–Composite Transducer Array Designed for Ultrasound Scanning Applications".

IEEE Transactions on Ultrasonics, Ferroelectrics, and Frequency Control, vol. 39, No. 3, May 1992, M. O'Donnell, et al., pp. 366–380, "Efficient Synthetic Aperture Imaging from a Circular Aperture with Possible Application to Catheter–Based Imaging".

IEEE Transactions on Ultrasonics, Ferroelectrics, and Frequency Control, vol. 42, No. 2, Mar. 1995, Yukio Ito, et al., pp. 316–324, "A 100–MHz Ultrasonic Transducer Array Using ZnO Thin Films".

Journal of American Ceramics Society, vol. 77, No. 9, pp. 2481–2484, J. W. Stevenson, et al., "Fabrication and Characterization of PZT/Thermoplastic Polymer Composites for High–Frequency Phased Linear Arrays".

(List continued on next page.)

*Primary Examiner*—Curtis Mayes
(74) *Attorney, Agent, or Firm*—Thomas J. Monahan

(57) ABSTRACT

A method for assembling an ultrasonic transducer, first produces a plurality of plates of piezoelectric material. Then the plates are bonded together through use of a polymeric matrix comprising a polymer and intermixed particles having determined dimensional parameters, the particles acting to separate the plates by predetermined distances that are dependent upon the determined dimensional parameters. Preferred particles are polystyrene spheres. A second embodiment produces a plurality of strips of green piezoelectric ceramic material, each strip including a layer of a fugitive material. The strips are then placed in a stack and the stack is fired to convert the green piezoelectric ceramic material into densified ceramic plates. The firing acts to drive off said second fugitive material and to leave voids. The voids are then backfilled with a polymeric material to create a unified structure.

10 Claims, 10 Drawing Sheets

OTHER PUBLICATIONS

Sensors and Actuators A, 41–42 (1994), pp. 167–173, J. V. Hans–field, et al., "An Integrated Multi–element Array Transducer for Ultrasound Imaging".

1994 Ultrasonics Symposium, pp. 1009–1013, M. Lethiecq, et al., "Miniature High Frequency Array Transducers Based on New Fine Grain Ceramics".

1994 Ultrasonics Symposium, pp. 1523–1526, P. A. Payne, et al., "Integrated Ultrasound Transducers".

* cited by examiner 2-2 Composite 1-3 Composite

METHOD FOR MANUFACTURE OF HIGH FREQUENCY ULTRASOUND TRANSDUCERS This Application claims priority from U.S. Provisional Application Ser. No. 60/082,491, filed Apr. 21, 1998.

FIELD OF THE INVENTION

This invention relates to methods for the manufacture of ultrasound transducers and, more particularly, to methods of manufacture that enable the construction of ultrasound transducers that are operable at frequencies in excess of 20 MHz.

BACKGROUND OF THE INVENTION

Ultrasonic imaging applications are being driven to higher frequencies to enable the imaging of smaller and smaller anatomical features. Very high frequency ultrasonic imaging systems, critical for improved diagnostic applications in dermatology and ophthalmology, await the development of arrays operating above 20 MHz. These high frequency arrays require small spatial scales (<10 µm) which cannot be achieved using conventional fabrication techniques.

Prior art arrays developed in this frequency range include a pair of 20 MHz PZT arrays. See: M. Lethiecq, et al., "Miniature High Frequency Array Transducers Based on New Fine Grain Ceramics," 1994 Ultrasonics Symposium, 1994, pp. 1009–1013; and A. Nguyen-Dinh et al., "High Frequency Piezo-Composite Transducer Array Designed for Ultrasound Scanning Applications," 1996 IEEE Ultrasonics Symposium, 1996, pp. 943–947. Ito et al. describe a 100 MHz array incorporating a sapphire lens and thin film ZnO in "A 100 MHz Ultrasonic Transducer Array Using ZnO Thin Films, "IEEE Transactions on UFFC", vol. 42, no. 2, pp. 316–324, March 1995. Payne. et al. describe a piezoelectric polymer array with built-in transmit and receive circuitry. See: "Integrated Ultrasound Traducers," 1994 Ultrasonics Symposium, 1994, pp. 1523–1526.

O'Donnel et al describe the operation of a 20 MHz phased array imaging system for catheter use. See: M. O'Donnel and L. J. Thomas, "Efficient Synthetic Aperture Imaging from a Circular Aperture with Possible Applications to Catheter Based Imaging, "IEEE Transactions on UFFC, vol. 39, no. 3, pp. 366–380, May 1992.

Linear arrays, which typically do not use beam-steering, can tolerate a much larger element pitch than phased arrays. It is thus practical to focus first on the development of linear arrays with 1λ to 2λ pitch. Although integrating such an array with the electronics offers advantages, a more conventional and flexible approach of coupling the array elements to a 50 ohm imaging system has been adopted. Broad bandwidth (minimum of 40%) is desired, both to suppress grating lobes and to improve the axial resolution. Crosstalk levels of near −30 dB are considered acceptable for a linear array not incorporating Doppler. Finally, mild elevational focusing is desired for improved resolution in the elevation direction.

PZT "strip" vibrators (length>>width or height) with free boundary conditions require a width to height ratio of less than approximately 0.6 for proper pulse performance. For 30 MHz operation each PZT strip must therefore measure approximately 30 µm wide by 50 µm in height. For a 2-2 composite comprised of interleaved polymer and ceramic plates, optimized operation requires that the spatial scale of all constituents be much less than a wavelength. For example, the epoxy between each ceramic strip must be less than 10 µm in order to push spurious lateral resonances above the passband of a 30 MHz array. Conventional dice and fill technology cannot presently be used to manufacture this structure.

An alternative fabrication technique is to stack ceramic and polymer or other inert layers to form a block of composite material, then slice sections from this block. See U.S. Pat. Nos. 4,514,247 and 4,572,981 to Zola. Variants of this technique have been proposed for arrays operating above 10 MHz. J. Stevenson et al. in, "Fabrication and Characterization of PZT/Thermoplastic Polymer Composites for High Frequency Phased Arrays," J. Am. Ceramic Soc., 77[9], pp. 2481–2484, 1994, describe a method for fabricating a PZT/polymer composite transducer. Their method involves the bonding of sheets of thermoplastic polymer film and sintered PZT plates via thermal processing. The composites are then cut, electroded and poled to produce the required transducer structure.

The difficulty with the Stevenson et al. process is in controlling the ceramic and polymer dimensions. Without precise dimensional control, transducer operations are not reproducibly predictable.

Accordingly, it is an object of the invention to provide a method for the manufacture of high frequency ultrasound transducers which assures precise dimensional control of the ultimate transducer structure.

It is another object of this invention to provide a method of manufacture of piezoelectric composites and ultrasonic transducers incorporating such composites that are operable at frequencies in a range of 20 MHz and higher.

SUMMARY OF THE INVENTION

A method for assembling an ultrasonic transducer, first produces a plurality of plates of piezoelectric material. Then the plates are bonded together through use of a polymeric matrix comprising a polymer and intermixed particles having determined dimensional parameters, the particles acting to separate the plates by predetermined distances that are dependent upon the determined dimensional parameters. Preferred particles are polystyrene spheres. A second embodiment produces a plurality of strips of green piezoelectric ceramic material, each strip including a layer of a fugitive material. The strips are then placed in a stack and the stack is fired to convert the green piezoelectric ceramic material into densified ceramic plates. The firing acts to drive off said second fugitive material and to leave voids The voids are then backfilled with a polymeric material to create a unified structure.

DETAILED DESCRIPTION OF THE INVENTION

A first embodiment of the invention assures accurate spacing between piezoelectric plates by incorporating highly controlled-diameter polystyrene spheres (or other spacing material) into the polymer matrix. Such spheres enable precise spacings to be maintained between the piezoelectric plates. The method creates a regular array of piezoelectric plates embedded in a polymer matrix, with either individual electrodes on each strip or blanket electrodes over the entire structure.

A second embodiment of the invention assures accurate spacing between piezoelectric plates by assembling a stack of PZT green sheets, each of which includes a layer of fugitive ink. After firing, the fugitive ink has been eliminated, leaving voids where the ink previously resided. Backfilling the voids with a polymer in the densified structure results in a unified transducer structure.

Figure 1:
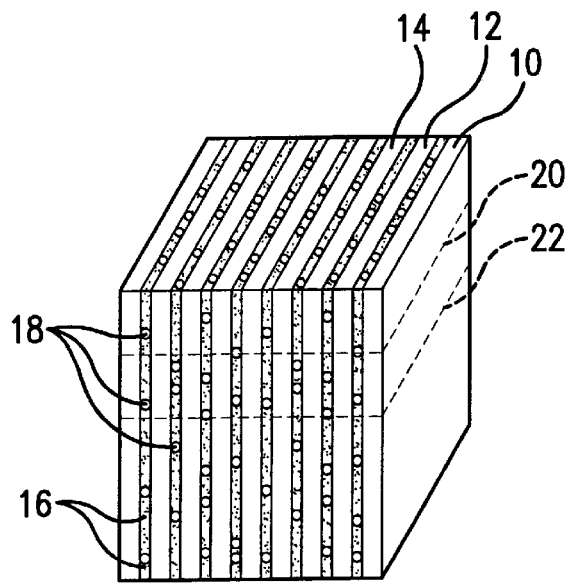
FIG. 1 is a perspective view of a transducer made in accordance with a first embodiment of the invention.

Referring to the first embodiment shown in FIG. 1. multiple slices 10, 12, 14, etc. of piezoelectric material are lapped to a thickness equal to the desired width of the transducer element. Alternatively, the material can be fabricated to this thickness using thick film, tape casting, sol-gel, or other techniques. If the piezoelectric material has been previously polarized it should be heated above the Curie temperature to eliminate all existing traces of poling.

Lapped slices 16, 12, 14, etc. of piezoelectric are stacked together and bonded using a matrix of adhesive 16 and incorporated particles 18. This bonding process is controlled so that the thickness of the bond line is predictable. Results show that particulate loading of the adhesive 16 will provide excellent results if attention is paid to bonding pressure, adhesive viscosity, particle size, and curing temperature.

The preferred particulate 18 is polystyrene spheres having 44% divinylbenzene inclusion and possessing a tight size distribution. Such polystyrene spheres are incorporated into a long pot life, low viscosity epoxy 16. The sphere size determines the thickness of the bond line. Polystyrene possesses elastic properties similar to the epoxy and only a small volume fraction of spheres is required. As a result, the combination of the spheres and the epoxy appears acoustically very much like a homogenous material. Aluminum oxide particles have also been used Ewith good results. If other particles are used, they can be selected to attenuate acoustic vibrations or provide desired elastic properties.

An alternative for controlling bond thickness, while not as preferred as polystyrene spheres, are fibers, fine mesh or thin strips of shim material to add space between the piezoelectric plates before applying the adhesive.

This method is also adaptable to provide nonuniform bond lines and ceramic thicknesses. This can reduce undesired lateral resonances in the finished composite or be used to fabricate a sparse array structure. To minimize damage during handling, a small number of oversize ceramic plates can be used. They can then be diced into smaller stacks and bonded a second time to provide a total stack height equal to the number of required elements in the composite or array.

Figure 2A:
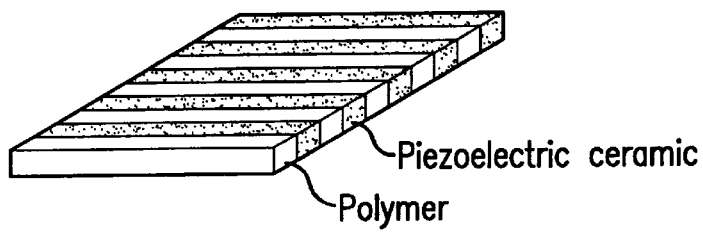
FIGS. 2a–2c illustrate a 2-2 composite, a 1-3 composite and a method for assembling a 2-2 multilayer composite, respectively.

Once the bonding has been accomplished, slices are then diced from the stack of piezoelectric plates, (i.e., along dashed lines 20, 22, etc.) using a precision dicing saw, wire saw, or similar technique that provides a small kerf size. The dicing wheel is oriented perpendicular to the plane of the plates and parallel to the width. A thin plate of piezoelectric strips embedded in epoxy results. This structure is termed a 2-2 composite by those skilled in the art. A 2-2 composite comprises side by side strips of polymer and piezoelectric ceramic plates. An example of a 2-2 composite is shown in FIG. 2a.

Figure 2B:
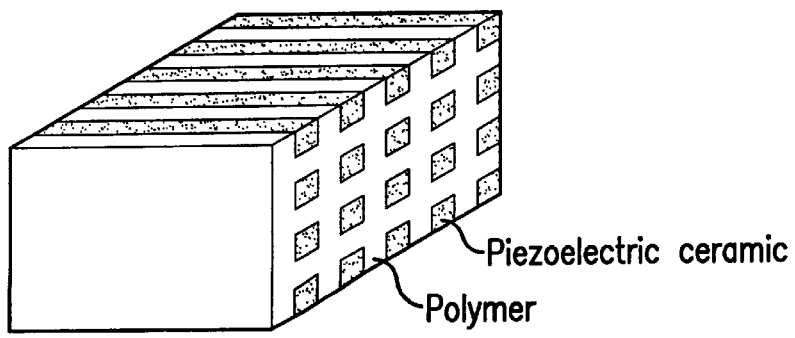
Figure 2C:
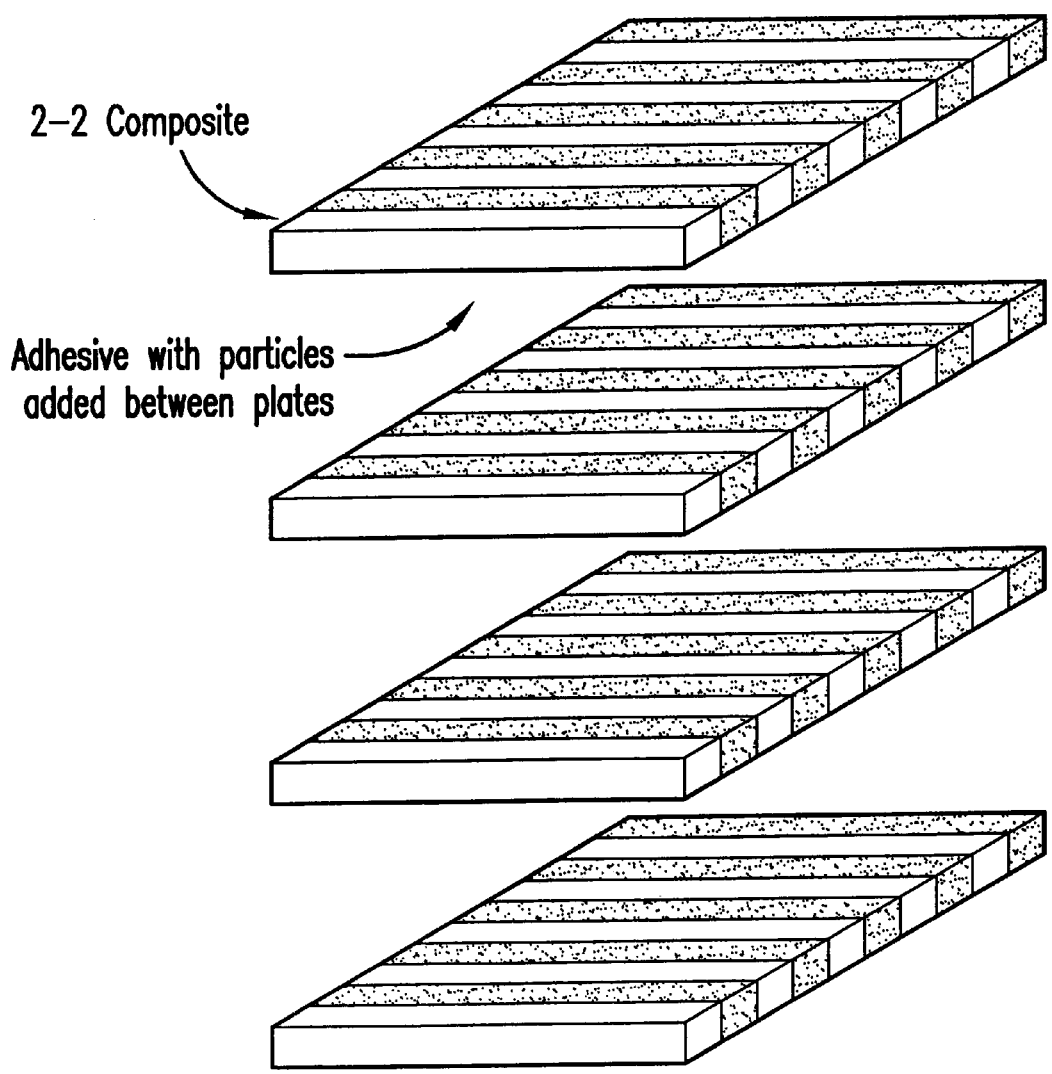

An additional composite structure that can be created with this technique is called a 1-3 composite, A 1-3 composite comprises posts of ceramic material in a polymer matrix. An example of a 1-3 composite is shown in FIG. 2b. If a 1-3 composite is desired, the plate can be lapped to a thickness equal to the desired post width. A second bonding step can be used to stack the plates with all of the ceramic plates aligned. Sections of this stack can then be sliced to produce a 1-3 composite. FIG. 2c schematically illustrates the aforesaid process.

The finished plate (either a 2-2 or 1-3 composite or the array structure) is then lapped and polished to the final thickness governed by the desired frequency of the finished device.

The plate is then electroded, and if necessary, tested and poled. Results have shown that coupling coefficients above 0.65 are obtainable for a 30 MHz 2-2 composite. For designs incorporating a high percentage of ceramic by volume (>75%), the upper frequency limit of this material is limited by the lateral mode vibration of the ceramic plate. For designs with a lower volume percentage of ceramic, the polymer vibration mode limits the upper frequency. Both of these modes must be higher in frequency than approximately twice the thickness resonant frequency of the composite. For the lapped ceramics described above this lateral vibration can be higher than 100 MHz, allowing the composite to operate above 50 MHz.

If a single element transducer is desired, the material can be treated like any other piezoelectric and fabricated using sandard techniques. If an array is desired, the following is a preferred process.

Figure 3A:
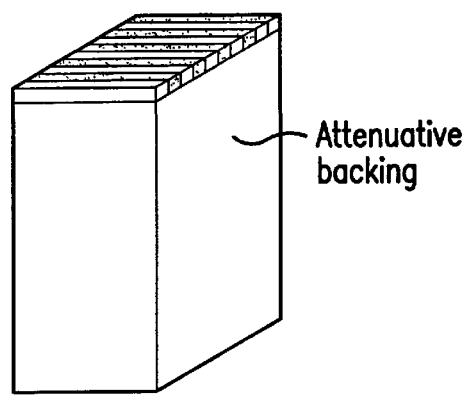
FIGS. 3a–3d illustrate steps in constructing a transducer that incorporates the invention.

1. The composite plate is bonded to an attenuative backing material that may or may not be conductive (see FIG. 3a).

Figure 3B:
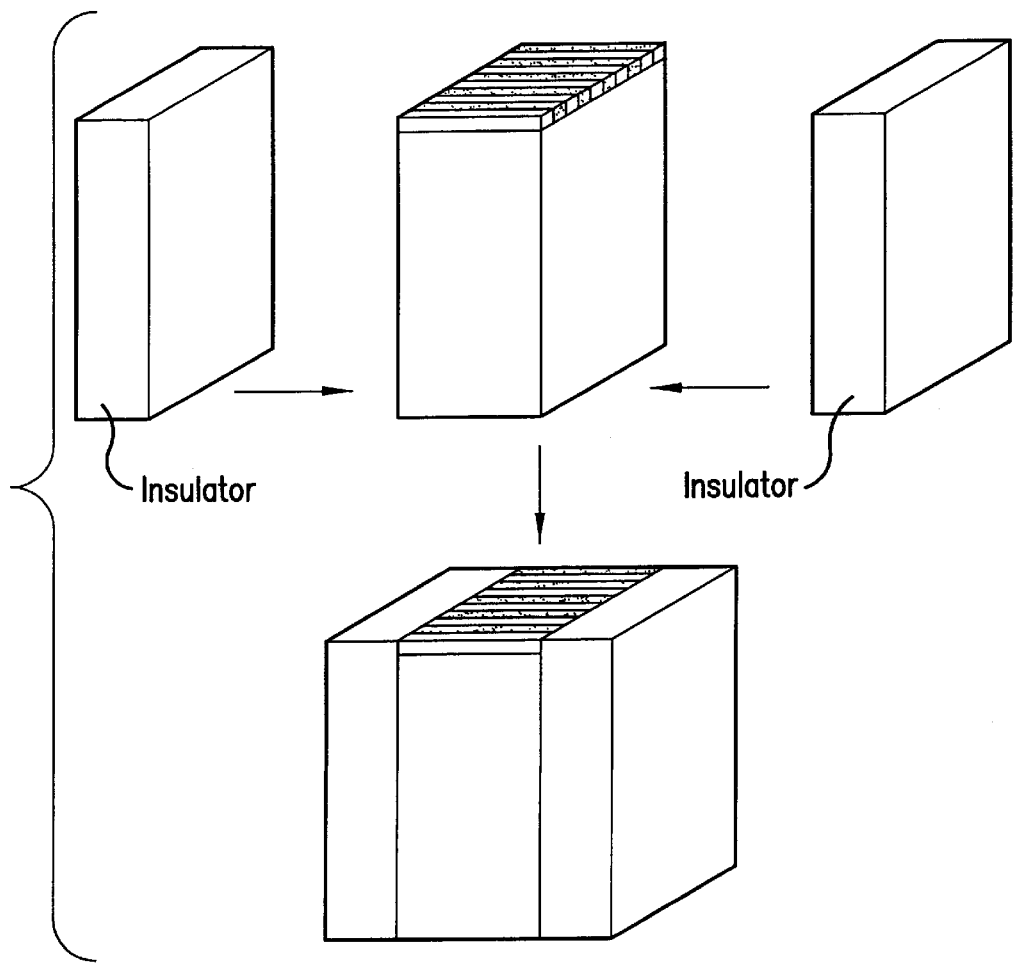

2. A rigid insulating material (e.g., ceramic) is bonded to the sides of the backed composite (see FIG. 3b).

Figure 3C:
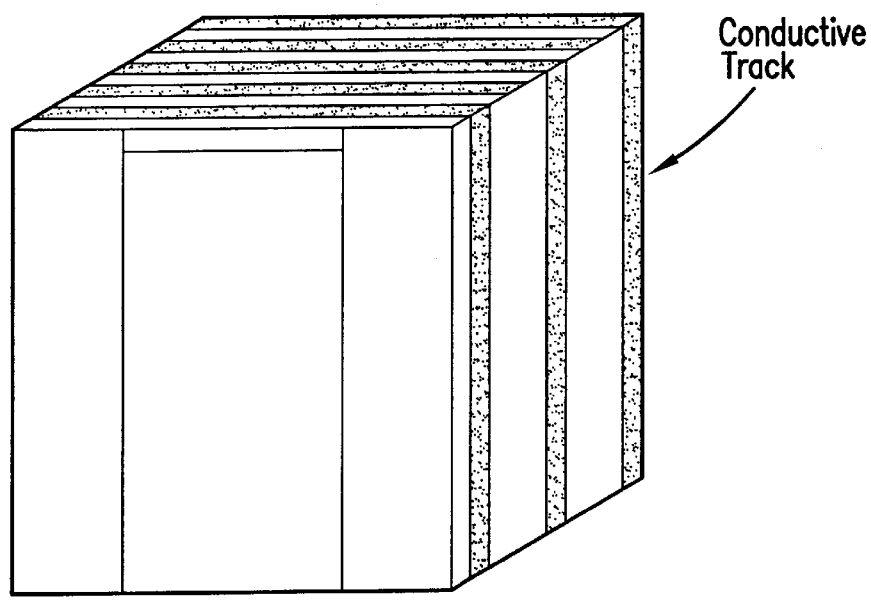

3. Electrode layers are applied to the face of the device and to the sides of the array assembly. Photolithography, laser dicing, or an equivalent process is then used to separate the electrode layers into electrode traces (see FIG. 3c). The conductive traces on the face of the array determine the size of the individual elements of the array. Each element can incorporate more than one ceramic and polymer rod, although the FIG. shows only one ceramic per array element. The conductive electrodes on the side of the array are separated by twice the element-to-element distance, effectively doubling the space between adjacent electrodes and allowing wire bonding or solder attachment to be used for interconnection to excitation circuitry.

4. The electrodes on the face of the array can be separated using one of the following methods:

Heat or solvents can be applied to soften the epoxy and the electrode can be "wiped" from the polymer filler without affecting the adhesion to the piezoelectric material. The electrodes, polymer, and piezoelectric materials used will determine whether this method is suitable. Preliminary results show this is possible with epoxy filler, a sputtered Cr—Au electrode, and a PZT ceramic as the piezoelectric.

If a transparent filler is used, photoresist can be applied to one side of the plate and a photolithographic technique used to develop the resist by transmitting light through the opposing side of the plate. This can be used to either mask the kerfs before applying the electrode or to mask the ceramics after applying the electrode. In the latter case the electrode can be removed using chemical etching. If a photoresist method is used, it must be preformed prior to bonding the array to the backing.

5. Matching layers or lenses can be added as required to the face of this device.

Figure 4A:
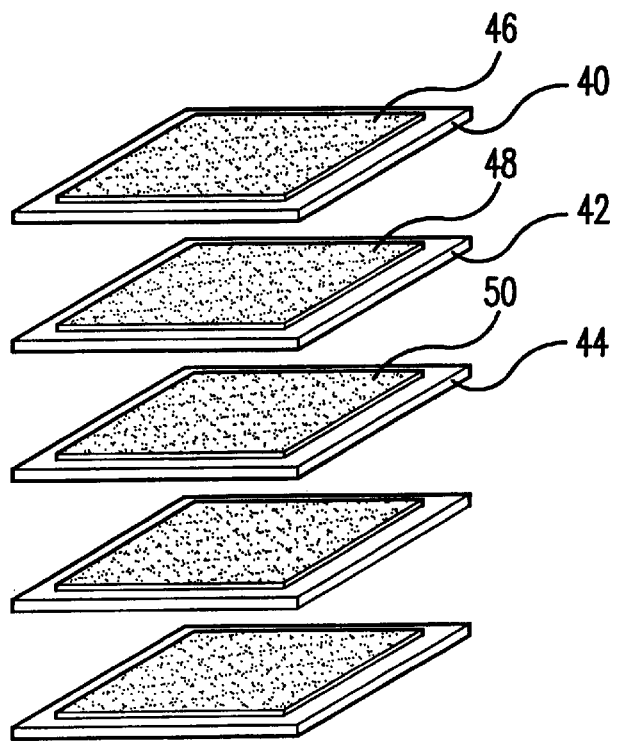
FIGS. 4a–4d illustrate a transducer made in accord with second embodiment of the invention.
Figure 4B:
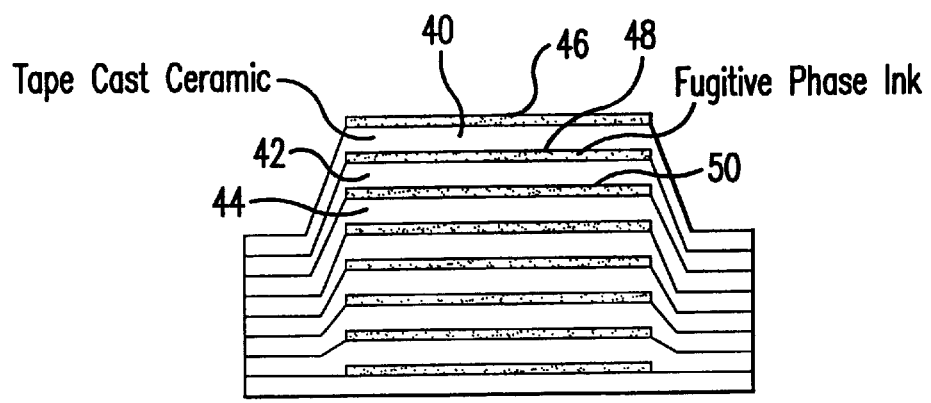
Figure 4C:
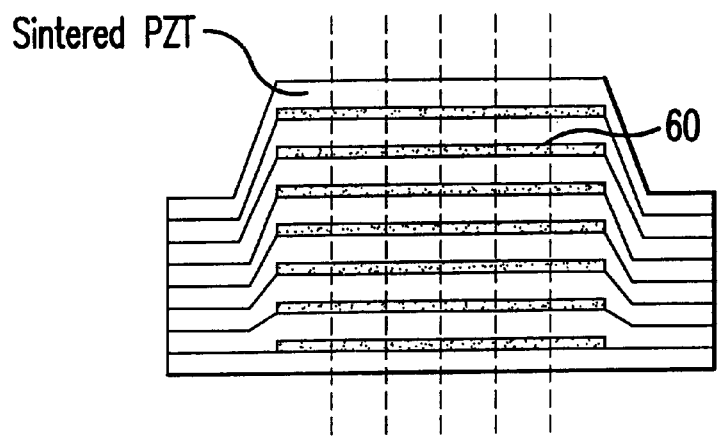
Figure 4D:
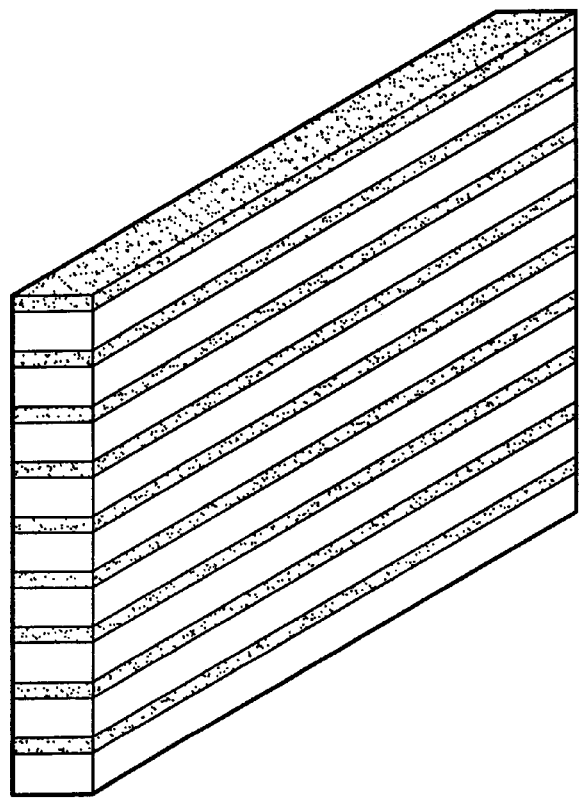

FIGS. 4a–4d illustrate the second embodiment of the method of the invention. As shown in FIG. 4a, a plurality of tape cast green sheets 40, 42, 44 etc. of a piezoelectric ceramic each have a layer 46, 48, 50, etc. of a fugitive phase ink applied to a surface thereof. The green sheets are then stacked (FIG. 4b), laminated and fired. The firing densifies the piezoelectric ceramic into the shape shown in FIG. 4c, and causes loss of the fugitive phase ink. Such loss results in the creation of planar orifices 60 between the adjacent piezoelectric ceramic plates. Thereafter, orifices 60 are backfilled with an epoxy filler and the resulting structure is then diced along dashed lines 62 to produce the transducer structure shown in FIG. 4d.

Experimental

Fine grain PZT-5H equivalent material (TRS 600, TRS Ceramics, State College, Pa.) was lapped to a thickness of 33 μm using a precision lapping process. Numerous plates of this material were stacked and bonded together using Epo-Tek 301-2 epoxy (Epoxy Technology, Billerica, Mass.). The plate to plate spacing was controlled by incorporating polystyrene spheres into the bonding epoxy. These spheres (#PS06N, Bangs Laboratories, Fishers, Ind.) possessed a nominal diameter of 6.20 μm, with a standard deviation of only 0.09 μm. The spheres were incorporated into the epoxy at a volume fraction of 5%. Plates of 5 mm×5 mm ceramic and a consistent amount of loaded epoxy were stacked in an alternating fashion. The stack was constrained from lateral motion and light, uniform pressure was applied during the room temperature overnight cure. Thin sections of this stack were diced from the block, lapped to a thickness of 62 μm, electroded with 4000 Å of Au over a thin Cr layer, and poled at 2000V/mm and 50° C.

The performance results are listed in Table I. Note the small standard deviation in kerf, indicating this technique can provide a controlled polymer width to within 0.3 μm. The observed value for the lateral mode frequency corresponds closely to the $d_{31}$ vibration of the ceramic plate, as expected for a 2-2 composite with a volume fraction exceeding 75%. A theoretical investigation of the composite performance showed excellent agreement with the experimental results.

TABLE I

| Measured 2—2 composite properties | |
|---|---|
| Kerf width | 7.7 μm |
| Standard deviation of kerf | 0.3 μm |
| Ceramic width | 33.5 μm |
| Standard deviation of ceramic | 0.5 μm |
| Dielectric constant, $\epsilon_{33}^s/\epsilon_o$ | 1100 |
| Thickness velocity at $F_p$ | 4050 m/s |
| 1st lateral mode frequency | 58.8 MHz |
| Coupling coefficient $K_t$ | 0.67 |

Fp is the parallel resonance frequency

Although developed for high frequency arrays, this composite fabrication technique may be adapted to single element transducers. A wide diversity of ceramics, polymers, and particles can be used to achieve desired properties. In addition, nonuniform structures may be readily produced for suppression of lateral resonances resulting from spatial periodicity.

Passive Materials

Although the piezoelectric composite is the heart of an array transducer, backing, matching, and lens materials are needed to increase device sensitivity and bandwidth and provide focusing. Materials were prepared in an effort to approximately match the impedances determined from one-dimensional modeling. A conductive epoxy backing material (E-Solder 3022, Von Roll Isola, Inc, New Haven, Conn.) was selected with sufficient attenuation to eliminate backing echoes over a round trip path length of 4 mm (twice the backing height). The longitudinal acoustic impedance of this material was 5.5 Mrayls at 30 MHz. This same material was centrifuged to provide a higher acoustic impedance (5.9 Mrayls) and used as the first matching layer in a dual matching layer design. Additionally, a matching layer incorporating 2–3.5 um silver particles in an epoxy matrix has demonstrated improved properties.

Requirements for a suitable lens material included a longitudinal velocity significantly different from tissue and a longitudinal impedance close to tissue. TPX (Mitsui Plastics, Inc., White Plains, N.Y.) met those requirements with an impedance of 1.8 Mrayls and a longitudinal velocity of 2170 m/s. Since this velocity is greater than the ultrasound velocity in water, a concave lens design was required. This is in contrast to a silicone lens material which typically requires a convex design because of an intrinsically low longitudinal sound velocity. The convex geometry may be preferred clinically since it is easily coupled to the human body, but the high attenuation in silicone materials results in very low device sensitivity. The concave TPX design was preferred acoustically because of the inherently low attenuation. In addition, attenuation in the concave design can favorably affect the beam profile, while attenuation in a convex design is generally detrimental.

Electrical Matching

In addition to acoustic impedance matching, electrical impedance matching was addressed. The electrical impedance of the elements in the 30 MHz array was over 100 ohms. In order to match these devices to a 50 ohm system, a transformer was desired. For this array excellent results were achieved using the coaxial cable connecting each element to the system. Using transmission line theory, an optimum length of low capacitance micro-coax from Precision Interconnect (Portland, Oreg.) was selected to transform the impedance and tune out reactive components. In addition, the coax served to increase bandwidth and "fine tune" the center frequency. This technique is well suited to devices in the frequency range of 20 to 60 MHz where the length of the coax will vary from approximately 3 m to 1 m, respectively.

The impedance transformation achieved with coaxial cable was analyzed using known transmission line equations. The first step in quantifying this transformation was to characterize the impedance ($Z_0$) and propagation constant ($\gamma$) of the coaxial cable. This was accomplished using an HP4194 impedance analyzer and the expression for the impedance transformation from a length x of coax:

$$Z_x = Z_o \frac{(Z_{load} + Z_o \mathrm{Tanh}(\gamma x))}{(Z_o + Z_{load} \mathrm{Tanh}(\gamma x))} \quad (1)$$

where $Z_{load}$ represents the load at the end of the coax and $Z_x$ is the transformed impedance measured by the impedance analyzer. The values of $Z_x$ for short circuit and open circuit values of $Z_{load}$ were measured at 30 MHz and equation (1) was used to solve for $\gamma$ and $Z_o$. The distributed network representation of a transmission line then resulted in the following expressions:

$$\gamma = \sqrt{(r+j\omega l)(g+j\omega c)} \quad (2)$$

$$Z_0 = \sqrt{\frac{(r+j\omega l)}{(g+j\omega c)}} \quad (3)$$

The quantities r,l,g, and c are the per unit length values of series resistance, series inductance, shunt conductance, and shunt capacitance, while $\omega$ is the frequency in radians per second. The propagation constant $\gamma$ was then analyzed in terms of the real part ($\alpha$ or attenuation) and imaginary part ($\beta$ or phase constant). The phase constant was used to obtain the velocity of propagation from the relationship:

$$c = \frac{\omega}{\beta} \quad (4)$$

The coax selected for this array was fully characterized using the technique described above and the results are listed in table III below. The characteristic impedance of the coax lies between the impedance values of an array element (150 to 200 ohms) and the system (50 ohms). It was therefore possible to broaden the bandwidth of the element using this coax. Ideally, the impedance of the coax should be optimized for the array impedance.

TABLE III

| Coax properties measured at 30 MHz | |
|---|---|
| Characteristic impedance $Z_o$ | 85 − 5.2i ohms |
| Propagation constant $\gamma$ | 0.051 + 0.78I |
| Propagation velocity | 2.4 × 10$^8$ m/s |
| r (resistance per unit length) | 8.4 ohms/m |
| C (capacitance per unit length) | 48 pF/m |
| G (conductance per unit length) | 49 μS/m |
| l (inductance per unit length) | 0.35 μH/m |
| Attenuation | 0.44 dB/m |

Figure 5A:
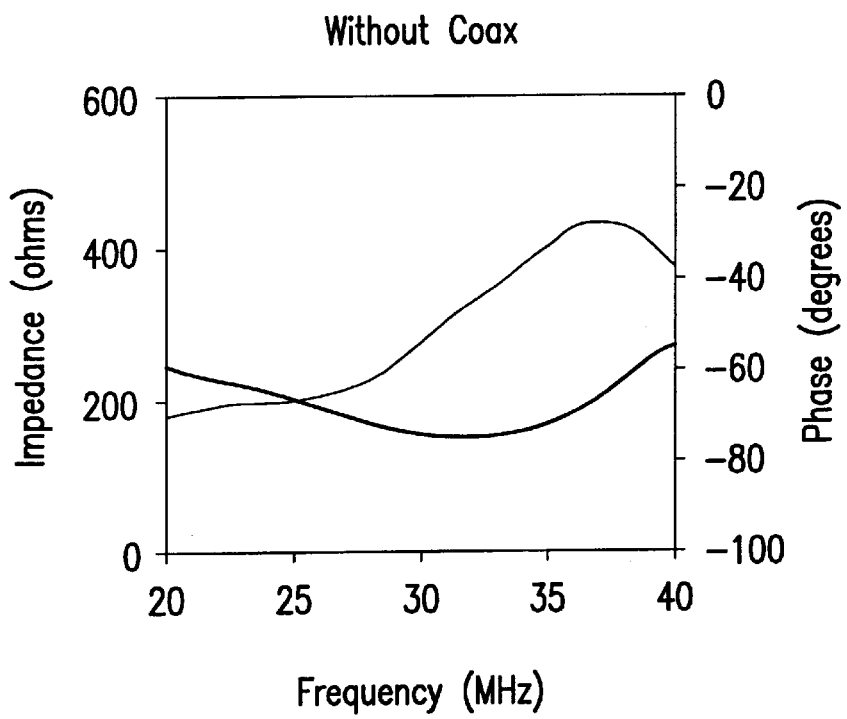
FIGS. 5a and 5b illustrate variations of phase and impedance, with and without coax, for a lensed element made in accord with the invention. The solid lines are impedance and the dotted lines are phase.
Figure 5B:
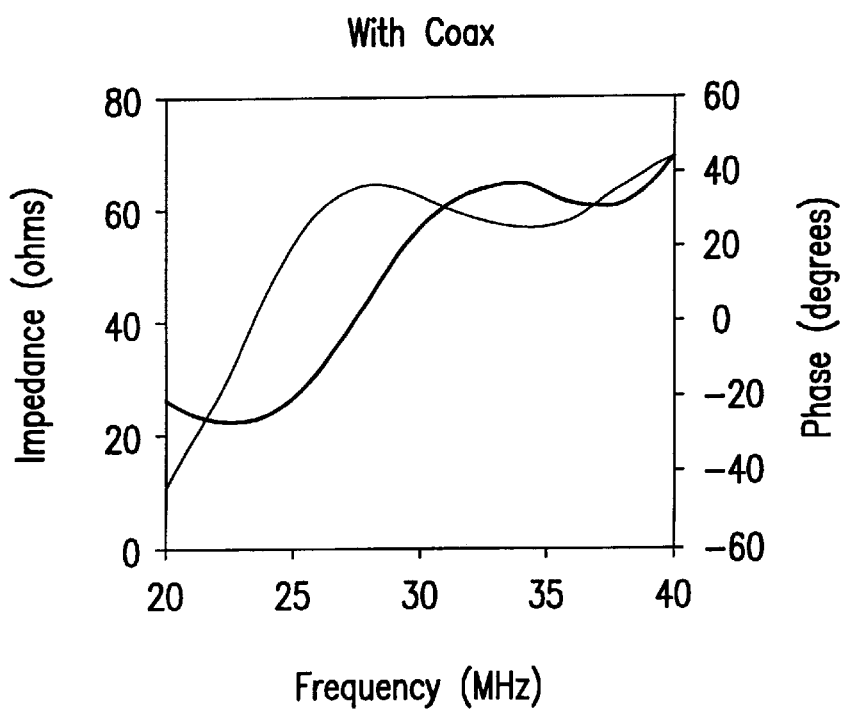

Once the coax was characterized the impact of varying the coax length was investigated using equation (1). In this case the array element impedance was used as $Z_{load}$. The transformed impedance across the expected passband of the device was analyzed for different lengths of coax above and below a quarter wavelength (2.0 m) at the center frequency. A range of lengths were found where the phase angle within the passband reached zero degrees. The bandwidth was optimized by interpreting the band edges as the points where the phase angle fell to +/−45°, a reasonable assumption when the phase angle passes through zero degrees. The results of this tuning are displayed in FIGS. 5a and 5b.

Transducer Design and Fabrication

Three different array designs were fabricated and tested. The most recent design incorporated three ceramic "subelements" per element, an "air" kerf separating each element, a dual matching layer, and a TPX lens. The fabrication of this device is described below. Both one dimensional equivalent circuits and multi dimensional finite element models were used to analyze the design. The Redwood equivalent circuit in PSPICE was used to select matching and backing materials and provide general design guidelines. For a more accurate representation of the performance the time domain finite element code PZFLEX (Weidleinger Associates, Inc, Los Altos, Calif.) was used.

A 2-2 composite was fabricated as described above and lapped to a thickness of 0.100 mm. The ceramic posts were 0.025 mm wide and the kerf was 0.008 mm wide. Next, the conductive epoxy backing, acoustic impedance of 5.5 Mrayls, was cast in place on the back of the composite. This backing was lapped flat and a frame was bonded to the edges of the entire assembly. This frame was fabricated from a machinable ceramic with a low dielectric constant. It was used to provide a surface for the conductive traces connecting each element on the face of the array. Once this frame was in place an additional 0.047 mm was lapped from the face, for a final composite thickness of 0.053 mm.

Interconnect reliability was a significant problem with the first prototypes. Sputtered Au/Cr electrodes were used to wrap the traces around the edges of the machinable ceramic. A dicing operation was then used to separate the wraparound traces. This method resulted in a loss of interconnect through small breaks in the metallization. An electroless deposition process proved more reliable, but adhesion was still problematic.

Figure 3D:
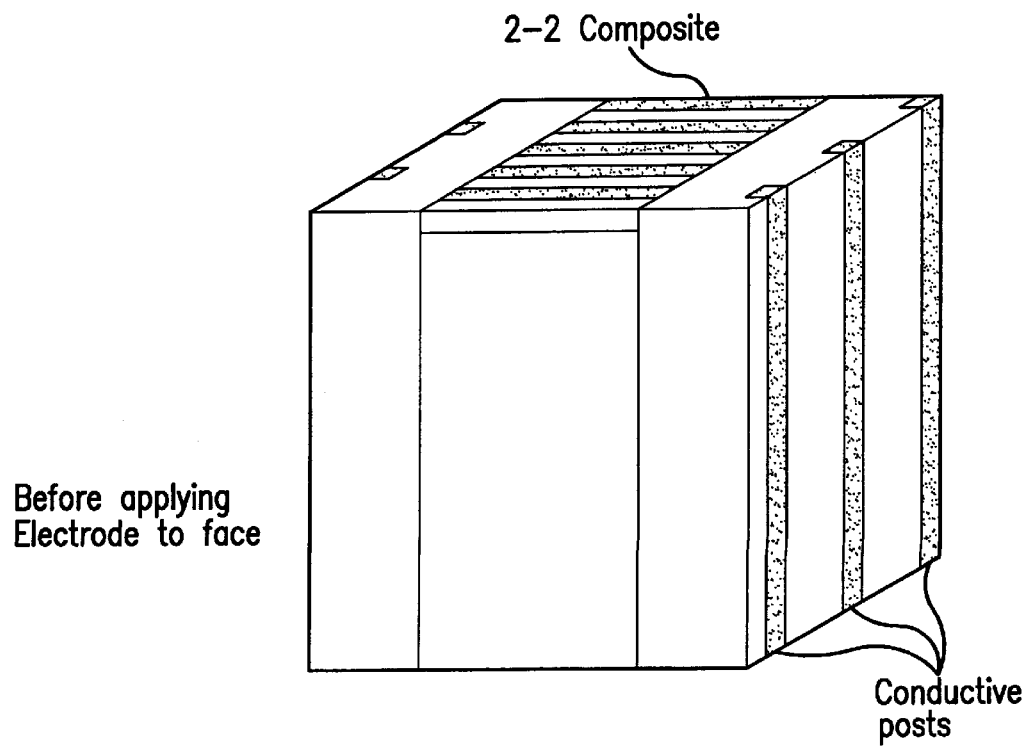

Two interconnect methods have been successfully tested. The first method uses posts of brass that are incorporated into the rigid insulating material bonded onto the sides of the array. The posts are spaced properly by fitting the brass pieces into slots that have been diced into the rigid insulators (See FIG. 3d). The posts of brass are put in place before the conductive electrode layer is applied to the face of the device. A second method uses a PC board on top of the rigid insulating material. The PC board incorporates a thick copper layer that can be easily diced to the proper spacing.

A conductive epoxy (5.9 Mrayl) was used as the first matching layer in order to decrease the possibility of losing electrical connection to one of the elements. A concern with this epoxy was the attenuation of 112 dB/mm at 30 MHz. This high value was probably due to the large silver flakes incorporated into the epoxy matrix. Since the desired matching layer thickness as determined from modeling was 0.014 mm, a 3 dB reduction in the sensitivity was expected. This attenuation, although undesirable, could be tolerated, and may even help to decrease near field clutter in the image. The improved matching layer incorporating 2–3.5 μm silver particles possess lower attenuation (approximately 20 db?mm) and thus offers superior performance.

After casting the first matching layer in place and lapping to thickness the elements were separated using a dicing saw and a 0.012 mm blade. The depth and thickness of the kerf was critical. The depth of the kerf affected crosstalk and ringdown. A larger kerf meant a smaller element size, reduced impedance, and an increased grating lobe amplitude in the focused beam. If a kerf filler was used, such a wide kerf could also translate into lateral modes within the filler falling within the passband of the device. As expected from the work of Dias (see "An Experimental Investigation of the Cross Coupling Between Elements of an Acoustic Imaging Array Transducer," Ultrasonic To Imaging, vol. 4, pp. 44–55, 1982), the depth of separation into the backing was found to be crucial. Finite element analysis was used to investigate this effect. Six different separation depths were modeled and the impulse response was inspected for amplitude and ringdown. A long "tail" on the waveform indicated a resonance within the backing due to the periodicity of the dicing. A higher than expected amplitude was a result of crosstalk. A separation depth of at least 18 $\mu$m into the backing was needed to reduce the amplitude and ringdown to near the levels for a fully separated backing. Further modeling was performed using differential dicing, where kerf depth alternated between two values. Dicing 18 $\mu$m and 36 $\mu$m into the backing was found to provide the best result, a 64% bandwidth and a ringdown of slightly more than two cycles. This model did not yet incorporate the TPX lens.

The element to element spacing was 0.099 mm, or almost two wavelengths at the design center frequency. This would place grating lobes in the array at 30°. In order to determine the impact of the grating lobes the directivity pattern of the array was calculated. The directivity of each element was determined using the non-rigid baffle condition. Discrete frequencies throughout the passband were analyzed as well as focusing throughout the depth of field. The worst case scenarios showed the grating lobes at −10 dB relative to the main lobe for the one-way response. This would be unacceptable in most imaging systems. Broad bandwidth, however, may help to ameliorate this problem. If a pulsed response is considered, the 1-way amplitude is reduced by the ratio of the number of cycles in the pulse to the number of active channels. For our array this reduction would be at least −12 dB, considering a two cycle pulse and a simple 8 channel system. Additional channels would result in a greater reduction. Grating lobes should therefore be at a manageable level assuming a two cycle impulse response is achieved.

After separating the elements, a second matching layer (3.1 Mrayls) was bonded to the face. A special bonding technique was developed so that adhesive would not flow into and fill the kerfs. This air kerf was used to reduce the element-to-element crosstalk within the array. The matching layer was prepared by lapping to 0.018 mm thick and carefully waxing to a flat base. Shims, several microns thicker than the matching layers, were then placed adjacent to the layer. A high viscosity epoxy (Insulcast 501, American Safety, Roseland, N.J.) was used as the adhesive. A thin, uniform film of the epoxy was scraped over the matching layer using the shims as a guide for a flat edged tool. The epoxy was cured slightly for 20 minutes to raise the viscosity and the array was pressed into place. Light pressure was applied and the assembly was cured. Analysis of the kerf (using electron microscopy) and the bond line (using scanning acoustic microscopy) revealed uniform adhesion across the face and minimum infiltration of the epoxy into the kerf.

Addition of the TPX lens to the array proved challenging. TPX, or Polymethylpentene, is a rigid plastic with low values of acoustic impedance (1.8 Mrayls at 30 MHz) and attenuation (6 dB/mm at 30 MHz). Chemically it is similar to Polypropylene and requires surface preparation before bonding. Two methods of preparation are Corona discharge and a Toluene based chemical adhesion promoter. Experiments demonstrated that adhesion promoter 459T (Lord Chemical, Erie, Pa.), when applied to a clean TPX surface, resulted in dramatically enhanced adhesion. Epo-Tek 301 (Epoxy Technology, Billerica, Mass.) was then used to bond the TPX to the face of the second matching layer. The bond line between the TPX and the second matching layer was less than 1 $\mu$m.

In order to provide proper alignment of the lens with the elevation aperture the lens was machined subsequent to bonding. A ball end mill was used in combination with an alignment fixture to mill the cylindrical curvature in the face. The depth of cut was controlled to within 0.005 mm. After machining, a polishing operation was used to provide a mirror finish to the lens.

The connection of the coax to each element was achieved using a precision soldering station, low melting point Indium based solder, and a 50× microscope. In the future a flex circuit may be used to connect all the individual coaxes, but for the four element prototypes this simple method proved adequate.

Experimental Results

Three different prototype transducers, each with four active elements, were fabricated and tested. The first device incorporated a single matching layer and 0.066 mm element-to-element spacing. The second device included a single matching layer and 0.099 mm element-to-element spacing. Both of these prototypes were tested using a flat plate target at a distance of 1 mm from the face of the device. The third prototype a incorporated the dual matching layers and TPX lens described above. The elements in this last device were tested using a flat plate target placed at the focal point.

Figure 6A:
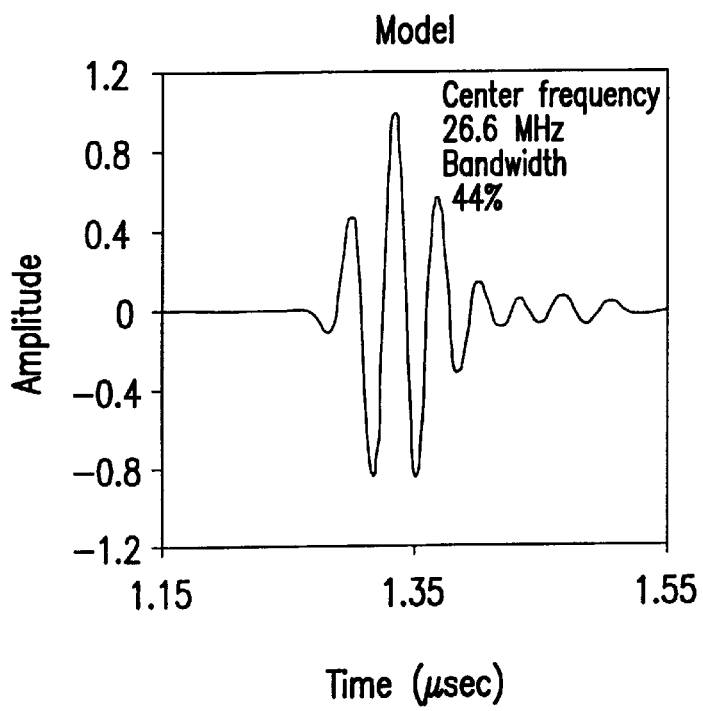
FIGS. 6a and 6b illustrate normalized impulse response (modeled and experimental) of a first test array.
Figure 6B:
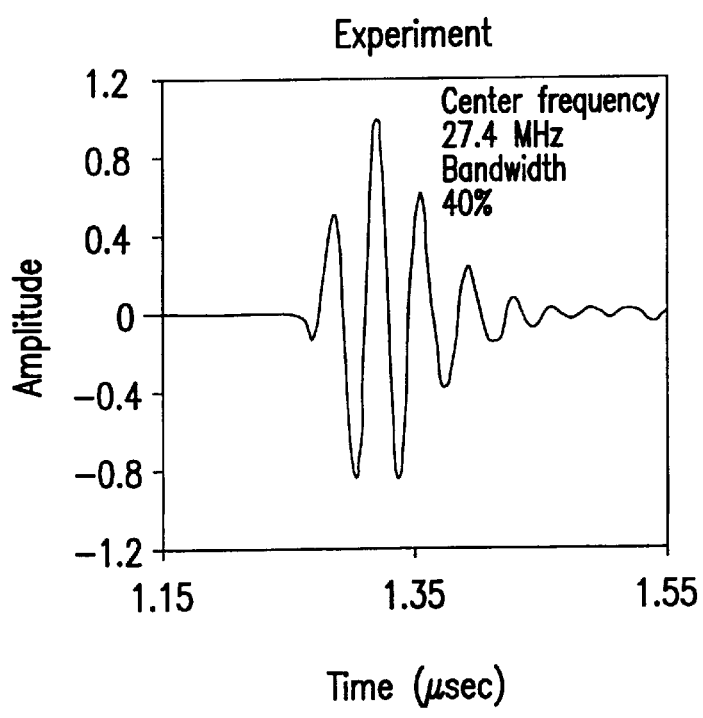
Figure 7A:
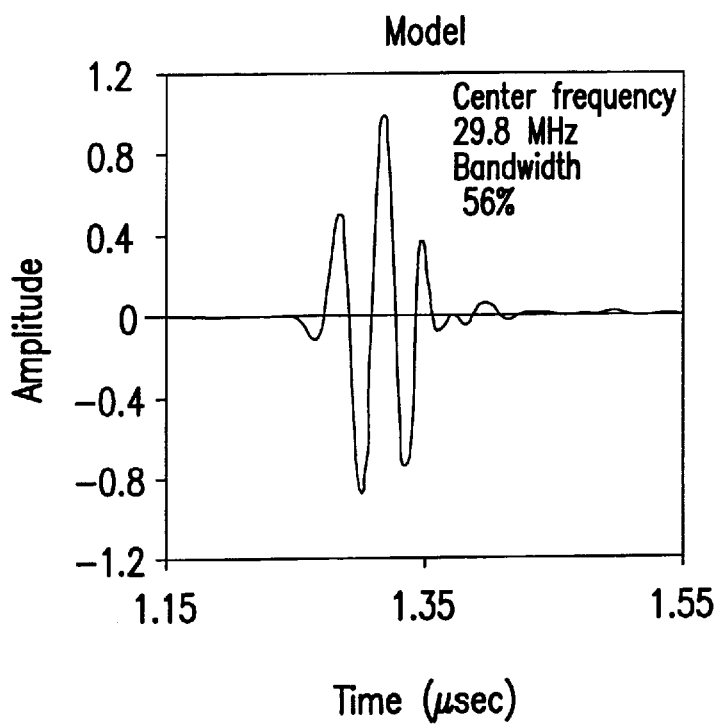
FIGS. 7a and 7b illustrate normalized impulse response (modeled and experimental) of a second test array.
Figure 7B:
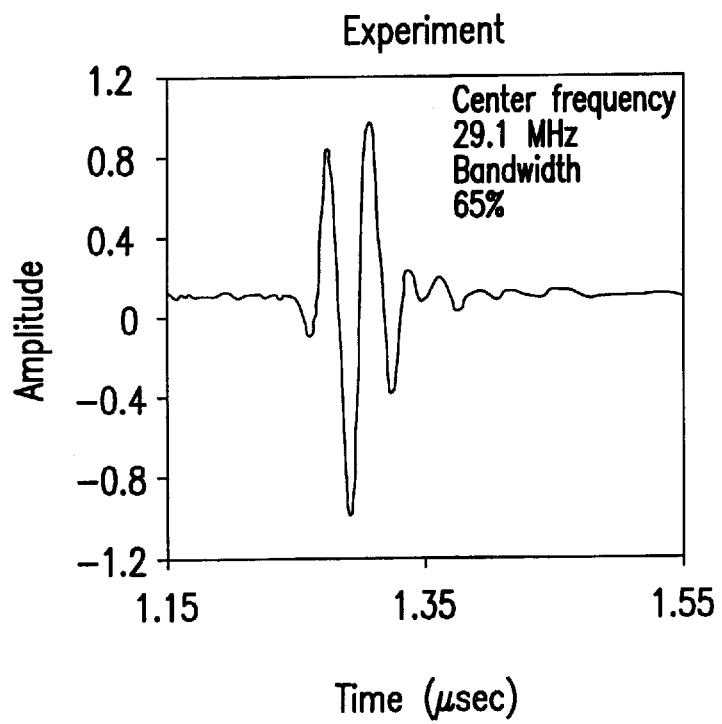

The simplest design incorporated a single 3.3 Mrayl impedance matching layer and an element pitch of 0.066 mm. This resulted in two ceramic subelements per element. A shallow isolation cut, 5 $\mu$m deep and 171 $\mu$m wide, was used to separate the elements. Most of the element-to-element separation was therefore provided by the composite filler. This epoxy filler was very hard and possessed minimal attenuation (9 dB/mm). Crosstalk was expected to be a problem for this design, but if the test results proved promising the fabrication process could be greatly simplified. Instead of dicing to provide element isolation, a photolithographic process could be used on a plate of composite material. A comparison of modeled and actual pulse echo impulse responses is shown in FIGS. 6a and 6b. Of the four responses the one with the lowest bandwidth is displayed. The amplitudes of the responses were all within 15% of the average and the pulse shapes were similar. These first results displayed the utility of finite element modeling and demonstrated that 30 MHz arrays could be fabricated and tested A second test array incorporating a single matching layer was also constructed. The element pitch was 2$\lambda$, with three ceramic subelements per element. This resulted in a larger element and a lower electrical impedance when compared to the 1.3$\lambda$ spaced array. This lower impedance was more effectively transformed to 50 ohms using the coax and broader bandwidth resulted. Experimentally, the bandwidth was 65% and the pulse length was less than 2 cycles. FIGS. 7a and 7b display the modeled and experimental impulse responses for this array. Although there is some disparity between the actual and modeled results, the agreement is still good. Slight deviations in actual materials values, such as a shift of 1 $\mu$m in the matching layer thickness, may account for the deviation.

Figure 8:
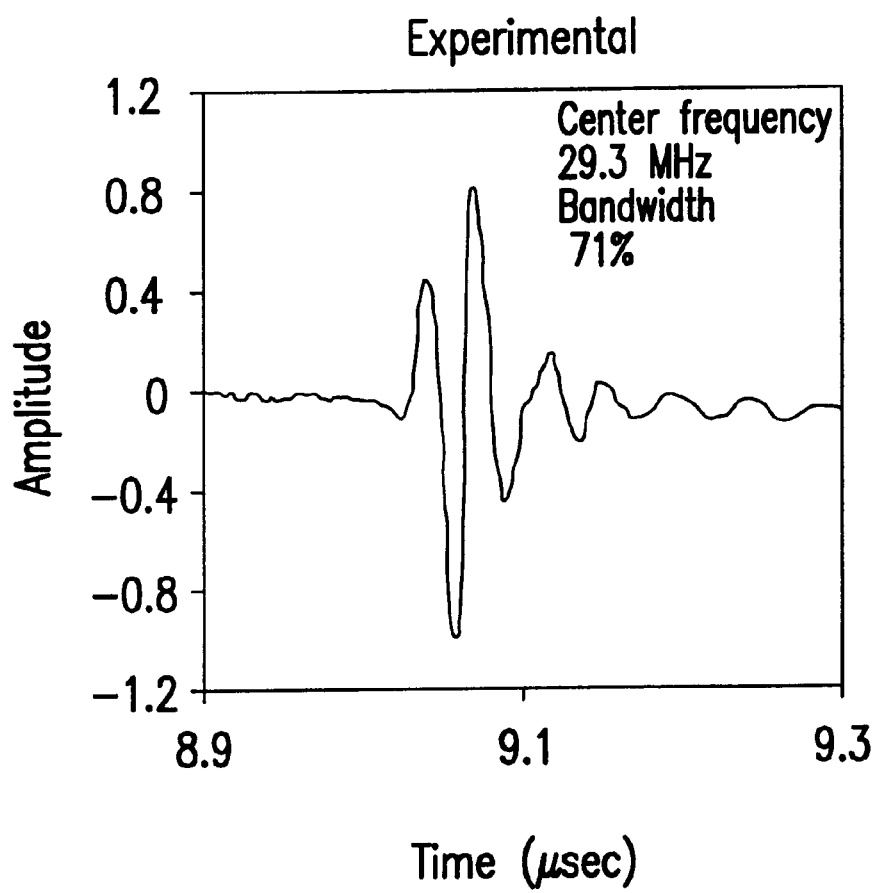
FIG. 8 illustrates normalized impulse response (experimental) of a third first test array.

The third and final test array incorporated two matching layers and a TPX lens. For this array a finite element model of the final design was not attempted. In order to account for the lens in the elevation direction a three-dimensional model, as opposed to the two-dimensional model used for the other arrays, was required. Modeling of the array without the lens was performed to ensure that the two matching layers provided a compact impulse response and that the array would focus properly. Without the lens the finite element model predicted a bandwidth of 64%. The TPX lens used a radius of curvature of 2.38 mm for a predicted focal point of 7.7 mm. Experimentally the focal point of the array was determined to be 7 mm. The impulse response for element 1, tested at this focal depth, is displayed in FIG. 8.

In summary, methods for fabricating 2-2 composites and arrays for applications above 20 MHz have been developed. The composites possessed high coupling ($k_t$>0.65) and lateral mode frequencies near 60 MHz. The arrays incorporated backing, matching, and elevational focusing. Coaxial cable was used for electrical impedance matching and an air kerf separated the elements. Finite element and one-dimensional modeling was used to analyze and refine the design. Experimental results show that 70% bandwidth can be achieved. Agreement between model and experiment was excellent.

Advantages of the method of the invention can be listed as follows:

Smaller ceramic and polymer dimensions can be realized. Current literature cites 0.013 mm as the smallest polymer dimension. This was achieved using a precision dicing saw. Using the invention, separations of 0.003 mm are realizable.

Aspect ratios (ratio of height to width of the ceramic or polymer) of greater than 5 to 1 can be achieved with the invention. This is presently difficult or impossible to achieve using conventional dicing.

Where fracture of elements during dicing is a problem. Since the invention builds the composite as a monolithic slab, fracture is not a problem.

The incorporation of particulates into the polymer filler can increase the attenuation of ultrasound in the space between the elements or modify the elastic properties of the filler. Using a standard dicing and filling approach it is difficult to add any particles into this space, especially for devices operating above 5 MHz.

High viscosity polymers can be used as the adhesive, offering a wide range of options as the polymer matrix.

By providing interconnect to only half the elements on each side of the array standard wire bonding may be used to connect to each element It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

What is claimed is:

1. A method for assembling an ultrasonic transducer, comprising the steps of:

producing a plurality of plates of piezoelectric material; and bonding said plates together through use of a polymeric matrix, said polymeric matrix comprising a polymer and intermixed particles having determined dimensional parameters, said particles acting to separate said plates by predetermined distances that are dependent upon said determined dimensional parameters.

2. The method as recited in claim 1, wherein said intermixed particles are comprised of polystyrene.

3. The method as recited in claim 2, wherein said intermixed particles are polystyrene spheres.

4. The method as recited in claim 1, wherein said intermixed particles are comprised of aluminum oxide.

5. The method as recited in claim 1, wherein said intermixed particles comprise portions of a connected matrix embedded in an epoxy.

6. The method as recited in claim 1, wherein said piezoelectric plates are fired plates of piezoelectric ceramic.

7. The method as recited in claim 6, wherein every other piezoelectric plate is metallized on one edge and every intermediate piezoelctric plate is metallized on an opposed edge.

8. A method for assembling an ultrasonic transducer, comprising the steps of:

producing a plurality of strips of green piezoelectric ceramic material, each strip including a layer of a sacrificial material;

placing said plurality of strips in a stack and firing said stack to convert said green piezoelectric ceramic material into densified ceramic plates, said firing acting to drive off said sacrificial material and to leave voids where said sacrificial material was positioned; and backfilling said voids with a polymeric material to create a unified structure.

9. The method as recited in claim 8, wherein said sacrificial material is a fugitive ink.

10. The method as recited in claim 8, comprising the further step of:

dicing said unified structure to create a linear PZT transducer structure.

* * * * *

UNITED STATES PATENT AND TRADEMARK OFFICE
CERTIFICATE OF CORRECTION

PATENT NO. : 6,183,578 B1 Page 1 of 1
DATED : February 6, 2001
INVENTOR(S) : Ritter et al.

It is certified that error appears in the above-identified patent and that said Letters Patent is hereby corrected as shown below:

Column 1,
Line 7, insert the following:

-- STATEMENT OF GOVERNMENT RIGHTS

This invention was made with support from the Government under Grant No. P41-RR1795 by the National Institute of Health. The Government has certain rights in the invention. --.

Signed and Sealed this

Fourth Day of April, 2006

JON W. DUDAS
*Director of the United States Patent and Trademark Office*

UNITED STATES PATENT AND TRADEMARK OFFICE
CERTIFICATE OF CORRECTION

PATENT NO.         : 6,183,578 B1
APPLICATION NO.    : 09/295679
DATED              : February 6, 2001
INVENTOR(S)        : Timothy A. Ritter et al.

Page 1 of 1

It is certified that error appears in the above-identified patent and that said Letters Patent is hereby corrected as shown below:

Column 1, Line 7, replace the paragraph following the STATEMENT OF GOVERNMENT RIGHTS heading with the following paragraph:

This invention was made with government support under Grant No. RR011795, awarded by The National Institutes of Health. The Government has certain rights in the invention.

Signed and Sealed this

Thirteenth Day of March, 2012

David J. Kappos
*Director of the United States Patent and Trademark Office*